Jan. 17, 1950
D. GRIMALDI
2,495,096
MALTING PLOW MACHINE
Filed Dec. 14, 1946
4 Sheets-Sheet 4
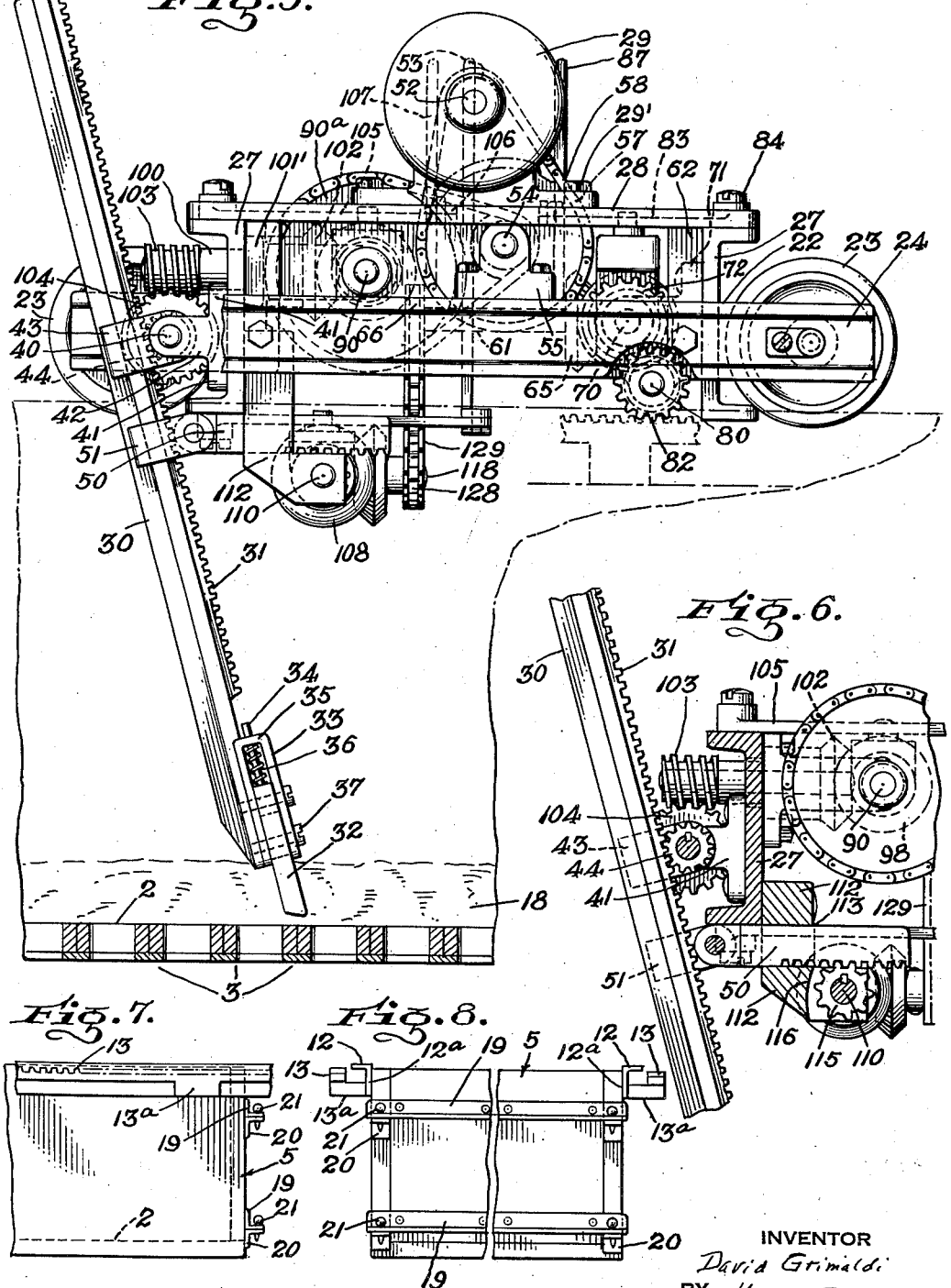
INVENTOR
David Grimaldi
BY
ATTORNEY Patented Jan. 17, 1950

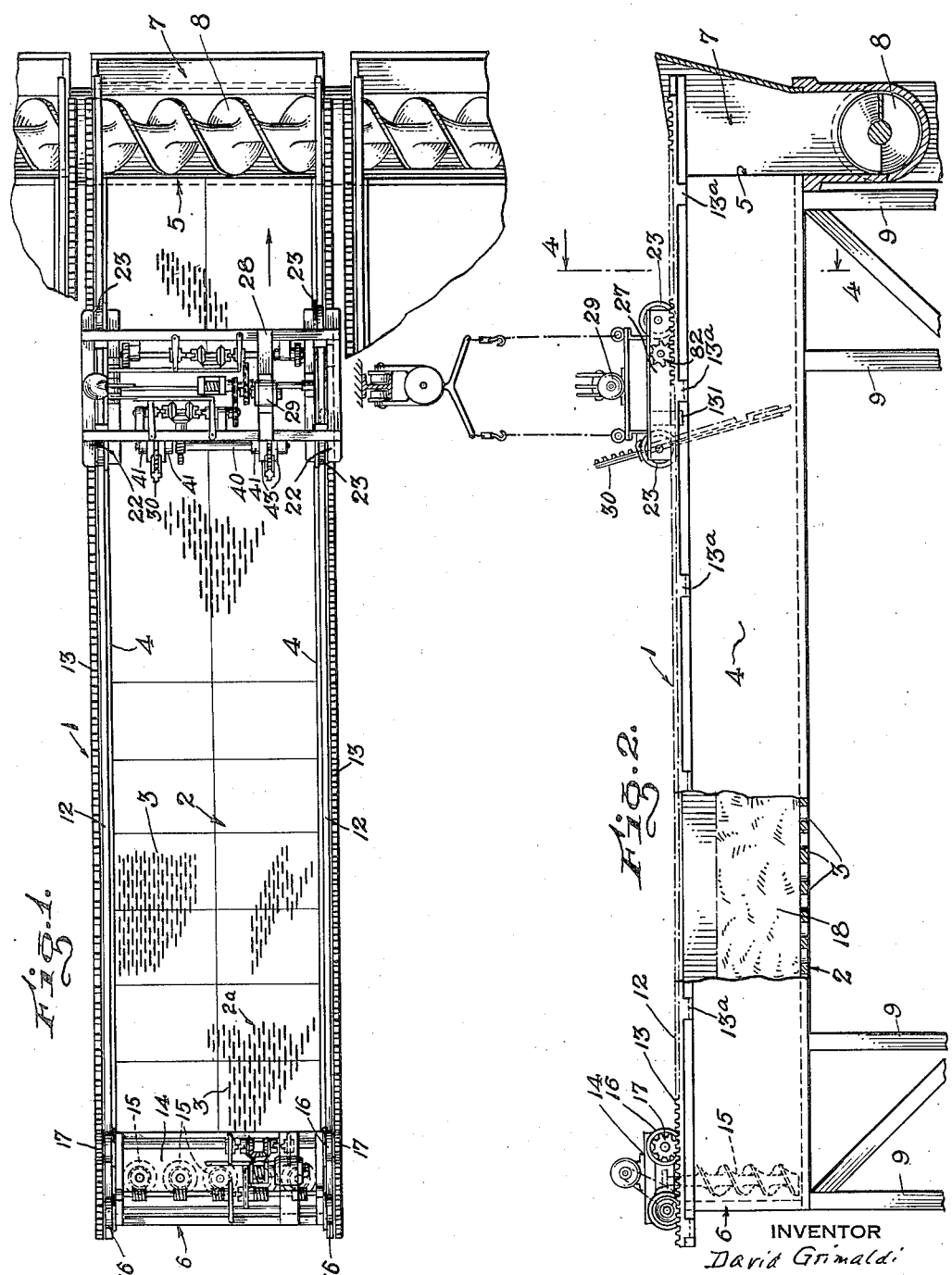

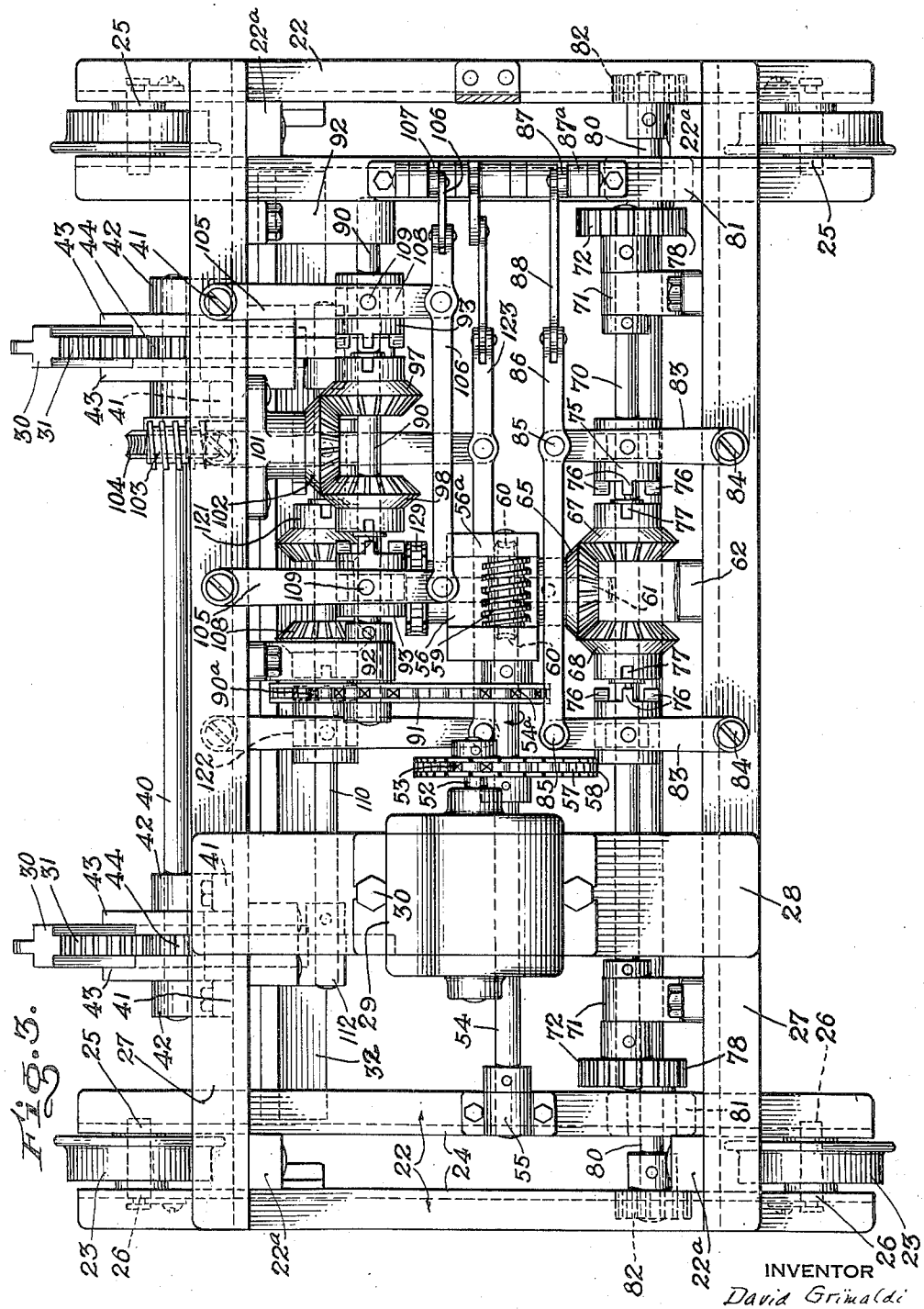

2,495,096

UNITED STATES PATENT OFFICE 2,495,096

MALTING PLOW MACHINE

David Grimaldi, Crystal Lake, N. J.

Application December 14, 1946, Serial No. 716,383

6 Claims. (Cl. 198—224)

This invention relates to a novel plow for discharging the grain from the malting compartments or beds used in the Saladin system of malting.

In the Saladin system, after the barley has been steeped in water, it is fed into long, narrow, rectangular malting beds where it remains during the germination period which varies according to the special practices of malsters, but usually lasts for about twelve days. The steeped barley has a very high moisture content when first fed into the beds, which gradually reduces as a substantial quantity of the water drains off through perforations in the bottom of the bed. It still retains however, a substantial moisture content when ready to be removed from the beds. Approximately at intervals of twelve hours it is turned by vertical helices of a turning machine which traverses the length of the bed. The purpose of this turning is to aerate the grain, check excessive temperature and promote an even growth.

At one end of the malting bed a hopper is provided which extends below the level of the bed floor, and at the bottom of which a screw conveyor carries the grain away for the next step in the malting process. This invention is concerned wholly with the means for discharging the grain from the bed into the hopper.

The means now employed in the system mentioned consist of a plow composed of a heavy plank slightly less in length than the width of the bed, which is usually about eight feet but maybe more, to which are secured two vertical hand control bars. The plank is provided with a bridle which is attached to a wire cable leading to a power driven winch.

The depth of the grain in the bed is about five feet, and in the case of the said present plow, it is necessary to manually dig a trench in the grain as deep as is desired, into which the plow is manually placed, whereupon it is drawn to the hopper end of the bed by the winch, two operators however, one at each hand control bar, riding the plow and keeping it in proper position. It is customary to dig the first trench about 20 feet from the hopper, discharge the grain in that section, and then go back progressively at intervals of about 20 feet, discharging each section in turn.

There are many difficulties involved in that method of plowing. It is dangerous work for the operators, and accidents are not infrequent. At the end of the bed, where the turning machine when not in use is located, it is not possible to place the plow under the turning machine, close to the helices, so that a substantial quantity of grain is left at that end which must be shoveled by hand to a place in the bed where the plow can reach it.

To overcome these difficulties and others not mentioned, I have provided a machine which under the control of a single operator will completely remove the grain from the bed into the hopper, in less time and far more efficiently than by the present methods, and with no hazard to the operator. I have provided a machine which drives the plow into the grain mass to the depth and elevates it therefrom to the height desired, changes the pitch of the plow member as desired through a wide angle, so that at the hopper end of the bed the plow member may reach forward under the carriage upon which it is mounted and completely discharge the grain into the hopper and at the turning machine end of the bed, may reach back under the turning machine close to the helices and remove all the grain at that end in either case without need of hand shoveling.

A further object of my invention is to provide a plow with a great flexibility of movement, powered by a single electric motor, simply controlled by one operator, durably and simply constructed, easy to maintain and repair, which completely eliminates manual labor other than that of the operator and which will substantially decrease the time now required to remove the grain from the bed.

A further object of my invention is to provide a machine which can be readily moved from one bed to another so that a single machine may suffice for a number of beds.

The foregoing and other objects of my invention will be apparent from the following description of the invention taken in connection with the annexed drawings in which Fig. 1 is a plan view of a malting bed of the Saladin system showing the pit at the discharge end, the malting plow machine, and the turning machine at the opposite end.

Fig. 2 is a side elevation, with parts broken away shown in section.

Fig. 3 is an enlarged plan view of the malting plow machine.

Fig. 5 is a side elevation at the plow end of the machine.

Fig. 6 is a sectional detail of the plow members and the immediate mechanism which elevates and tilts them.

Fig. 7 is a side elevational view of the gate of the malting bed.

Fig. 8 is an end view of the gate.

Figure 4:
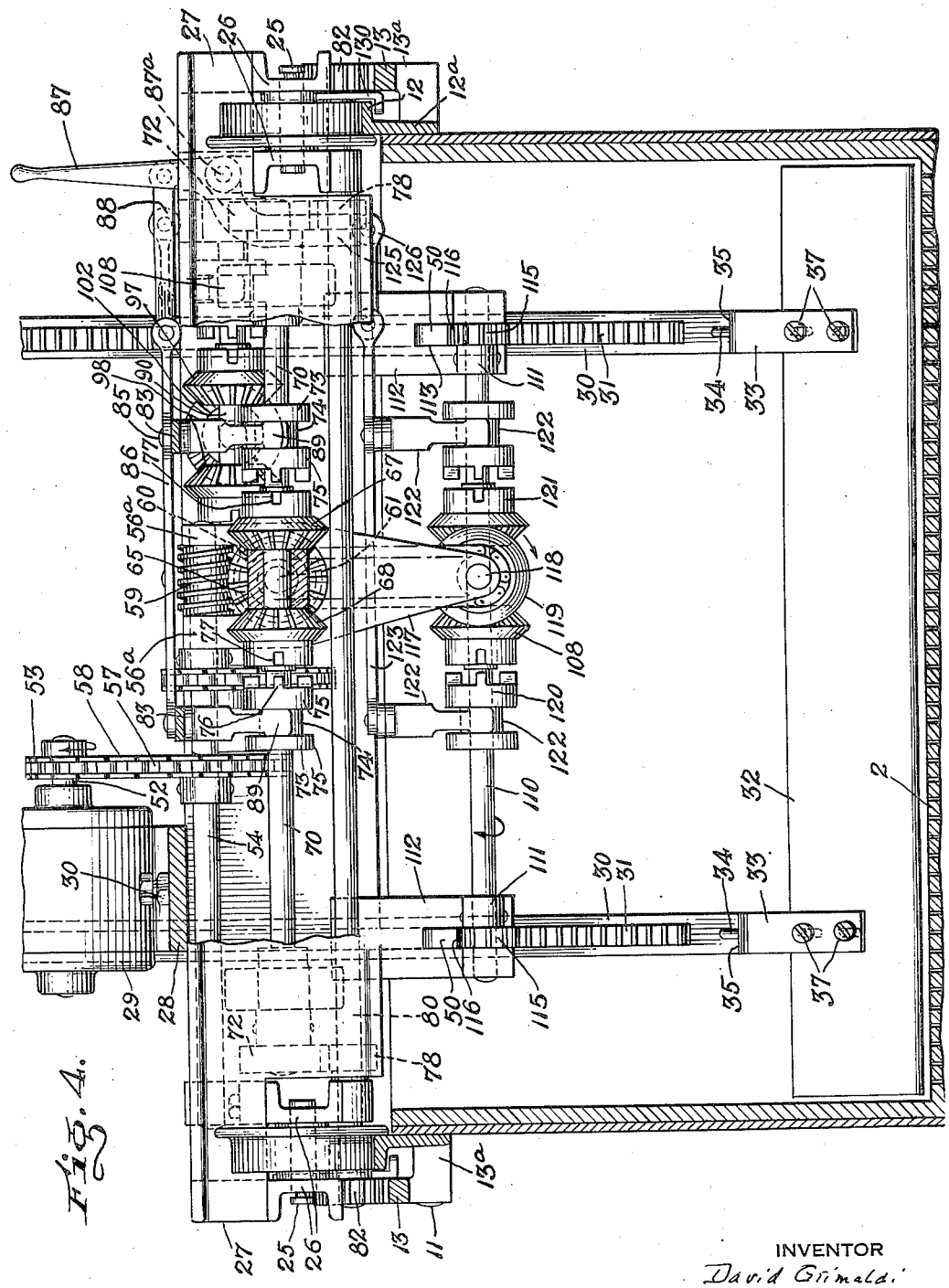
Fig. 4 is a vertical sectional view taken on the line 4—4 of Fig. 2 in the direction of the arrows.

Referring to the drawings:

The malting bed is shown in Figs. 1 and 2. 1 designates the malt bed generally, 2 its bottom composed of two rows of relatively thin metal plates 2A; perforated by staggered slots 3 and supported by a metal frame not shown; 4 designates its sides, 5 the gate at the hopper end, 6 the opposite end, 7 the hopper and 8 the helical conveyor. The malting bed is elevated from the floor by supports 9.

As shown in Figs. 4, 7 and 8, a steel beam of angle section having a short flange 12 and a longer flange 12a is secured to each side wall 4 of malting bed 1 at its top, with flange 12 which provides a track for car wheels 23 extending sufficiently above the top of malting bed 1 to provide clearance for the flanges of car wheels 23.

Racks 13 provided with L shaped lugs 13a at intervals, are secured to flange 12a by bolts 11, passing therethrough.

Tracks 12 and racks 13 extend the full length of malting bed 1 and project beyond its ends as shown in Figs 1 and 2. A notch 131 is cut in each track 12 partially across the width of track 12, said notches 131 being opposite each other, to permit car 24 to be lifted from the bed 1 when hooks 130, secured to side members 22 of car 24 are aligned with notches 131, and to permit placing car 24 upon another bed with hooks 130 aligned with notches 131 in the tracks of that bed.

The turning machine is designated as 14, its helices as 15. Its wheels 16 ride upon the track 12, and its traction gear 17 engages the rack 13. The grain mass is designated as 18 (Figs. 2 and 5).

The gate 5 fits inside the side walls of the bed. Two bars 19 of angle section are secured to the outside of the gate in parallel relationship and extend beyond the end walls. The horizontal flange of each bar 19 rests upon brackets 20 respectively secured to the outer ends of the sidewalls and gate 5 is held in place by pins 21 which extend through aligned holes in bars 19 and brackets 20.

24 designates the car member of the malting plow machine which is constructed with a pair of steel beams 22 of channel section spaced apart by spacing members 22a forming the side members of the car, the beams 22 of each pair being arranged with their flanges turned outwardly. Car wheels 23 are mounted between the beams 22 of each pair on axles 25 which extend through the beams 22 in which they have their bearings 26.

Steel cross-beams 27 of channel section form the end members of car 24, and extend completely across the side beams 22, the lower corners of each beam 27 being notched to permit this, as shown in Fig. 4. Beams 22 and 27 are secured together by angle plates or other well known means, which it has been considered unnecessary to show. The position vertically of side beams 22 on cross-beams 27 is governed by the distance of the axis of car wheels 23 above track 12.

A metal plate 28 is mounted on the cross-beams 27 (Fig. 3) serving as a platform upon which the electric motor 29 is mounted, being secured by machine screws 30.

The electric motor 29 furnishes the power for all the operations of the malting plow machine, namely, the movement of the car back and forth over the malting bed, the elevation and depression of the plow and the tilting of the plow lifts. The motor 29 is connected to the plant current by insulated electric cable carried on a reel or by other well known means, not shown.

The plow member consists of the plow lifts 30 and the plow 32 secured thereto. Plow lifts 30 are steel beams of T section, upon the flange of which racks 31 are mounted. The plow 32 consists of a plank having a length slightly less than the width of the bed and is secured to each lift 30 through the medium of the inverted U-shaped socket 33 so as to be capable of a vertical resilient movement. A rod 34 may be embedded in plow 32 and extends through a hole 35 in the top of socket 33. An expansion coil spring 36, surrounding guide rod 34, is mounted between the top edge of plow 32 and the top of socket 33, said spring 36 normally forcing plow 32 downward. Sockets 33 and plow 32 are bored to receive the retaining machine screws 37 which pass through them into a threaded bore in lifts 30, the bores in plow 32 being in the form of vertical slots permitting plank 32 to move a short distance up and down. The purpose of this resilient mounting being to cushion the plow member assembly against shocks which might be encountered from an uneven condition of the plates 2a which frequently occurs.

Plow lifts 30 are mounted as follows: Intermediate the side members 22 of car 24, two pairs of spaced brackets 41 of T section are secured to the outer side of the web cross member 27. Shaft 40 is mounted with its bearings in the legs 42 of brackets 41. Plow lifts 30 are hung from shaft 40 by two pairs of hangers 43, one pair of which is mounted in the space between one pair of brackets 41 and the other pair in the space between the other pair of brackets 41. Each hanger 43 has a bore at one end to receive shaft 40 and is recessed at the opposite end to fit over the flange of lift 30, providing a sliding fit on lift 30 and a rotatable fit on shaft 40. Each hanger 43 is separated from its opposite hanger 43 by a pinion 44, keyed to shaft 40, which meshes with rack 31 of lift 30.

Plow lifts 30 are also connected to rack bars 50 by two pairs of hangers 51, of the same type as hangers 43, one pair straddling the end of one rack bar 50 to which it is pivotally connected, and the other pair being similarly connected to the other rack bar 50, the free ends of hangers 51 being recessed to fit over the flange of lift 30, as in the case of hangers 43, providing a sliding fit on lift 30.

Shaft 40 is part of the mechanism which elevates and lowers the lifts 30, and rack bars 50 are part of the mechanism which tilts or changes the pitch of the lifts 30, both of which mechanisms are later fully described.

The movement of car 24 on top of the bed is accomplished as follows:

Shaft 52 of motor 29 is provided with a sprocket 53. A jack shaft 54 is mounted below and to the right (as seen in Fig. 5) of motor shaft 52, having a bearing at one end in the T section bracket 55 secured to the inner side member 22 (Fig. 3) and at the other end in the upper projections 56a of the floating bearing member 56.

The jack shaft 54 is provided with a sprocket 57 and is driven by the chain belt 58 which passes around sprocket 53 on the motor shaft 52 and sprocket 57 on the jack shaft 54.

Jack shaft 54 is provided with a worm 59 at the right hand end of the shaft, as seen in Fig. 3, which meshes with a worm gear 60 mounted on shaft 61 immediately under worm 59. Shaft 61 is mounted in bearings in the T section bracket 62 secured respectively to the cross member 27. Shaft 61 also has a bearing in the lower part of floating bearing 56 through which it passes and supports.

Shaft 61 at its front end is provided with a bevel gear 65 and towards its opposite end with sprocket 66.

Bevel gear 65 meshes with bevel gears 67 and 68 which are freely mounted on shaft 70, which is mounted in bearings in the T section brackets 71 secured to the rear cross member 27. A gear 72 is mounted at each end of shaft 70. Clutch members 73 each having a reduced center portion or hub 74 spacing two clutch collars 75 integral therewith, are slidably mounted on shaft 70 by means of a key and keyway. The innermost collars 75 of clutch members 73 have protruding teeth 76 which respectively engage recesses 77 in the opposed bevel gears 67, 68.

Gears 72 mesh with gears 78 mounted on shaft 80 adjacent to side members 22, shaft 80 being mounted in bearings in the T section brackets 81 secured to the under side of the opposed innermost members 22. Shaft 80 extends at each end past the side members 22 and at each end a traction gear 82 is mounted which meshes with rack 13 at each side of the top of the bed. The lower flange of the outermost side members 22 is cut away in the vicinity of gears 82, (Fig. 5) to give clearance for the latter.

The operation of clutch members 73 is as follows: Links 83 are pivotally mounted on the rear cross member 27 at 84, and their extremities 85 are pivotally connected to cross link 86 which is connected to hand control lever 87 by link 88 pivotally connected to each. Hand control lever 87 is fulcrumed to side member 22 at 87a (Fig. 4). Pivotally secured to and depending from cross link 86 are the forks 89 which straddle the hubs 74 of clutch members 73 between the clutch collars 75 and push clutch members 73 either to right or left (Fig. 3) according to the movement imparted by the hand control lever 87.

The operation of the said mechanism for driving car 24 will be understood from the foregoing description but briefly may be summarized as follows: The electric motor through the chain drive 58 drives jack shaft 54. Worm 59 on jack shaft 54 through worm gear 60 drives shaft 61 and bevel gear 65.

Bevel gear 65 drives shaft 70 through whichever of bevel gears 67 and 68 is brought into driving relation with shaft 70 by being engaged by a clutch member 73, it being understood that shaft 70 is driven through one or the other of bevel gears 67 and 68 according to the direction of movement desired, and never through both. With a clockwise revolution of motor shaft 52, the thrust of hand control lever 87 to the left, as viewed in Fig. 4, thereby putting bevel gear 67 in driving engagement, the machine will advance in the direction from the plow end of car 24 to the opposite end, that is, in the direction in which it plows. The thrust of hand control lever to the right will bring bevel gear 68 in driving engagement and the machine will travel in the reverse direction.

The mechanism for elevating and lowering plow lifts 30 is as follows:

A sprocket 54a is mounted on jack shaft 54. A larger sprocket 90a is mounted on shaft 90, the two sprockets being connected by chain belt 91.

Shaft 90 is mounted in bearings in the T section brackets 92 secured to the web of cross member 27 at the plow end of the carriage. Shaft 90 carries the same type of bevel gears and clutch members as employed on shaft 70 in the mechanism for driving the car heretofore explained, and operating in the same manner, with one exception hereinafter mentioned. Bevel gears 97 and 98, freely mounted on shaft 90, correspond to bevel gears 67 and 68 on shaft 70; clutch members 93, slidably mounted by key and keyway on shaft 90 correspond to clutch members 73 on shaft 70.

Shaft 100 is mounted in a bearing in the T section bracket 101 secured to cross member 27 at the plow end of car 24. At one end it carries bevel gear 102 which meshes with bevel gears 97, 98, and at its other end it carries a worm 103 which meshes with worm gear 104 on shaft 40.

The same type of linkage system is employed for engaging either of clutch members 93 with its opposed bevel gear 97 or 98, as is employed in the mechanism for driving the carriage heretofore described. Links 105 are pivotally mounted on cross member 27, are pivotally connected at their outer ends with cross link 106 which in turn is connected to hand control lever 107 by cross link 106a. Forks 108 are pivotally secured to and depend from link 106 at 109 which straddle the hubs of clutch members 93 and move them to the right or left according to the movement imparted by the hand control lever 107 which is fulcrumed to side member 22.

Thus shaft 90 is driven by jack shaft 54 through chain drive 91. Whichever of clutch members 93 is brought into engagement with its opposed bevel gear 97 or 98 as the case may be, will place that bevel gear in driving relationship with shaft 90 and that bevel gear will drive the bevel gear 102. This is the exception previously noted in comparing the arrangement of bevel gears and clutch members on shaft 90 with those on shaft 70. In the case of the bevel gears 97, 98 on shaft 90, the bevel gear put in driven relationship drives bevel gear 102, whereas in the case of bevel gears 67, 68 on shaft 70, the one put in driving relationship is driven by bevel gear 65.

If hand control lever 107 is thrust to the right, thereby bringing the left hand clutch member 93 into engagement with bevel gear 98, bevel gear 98 will then drive bevel gear 102, worm 102 will drive worm gear 103 on shaft 40, and pinions 44 on shaft 40 meshing with racks 31 on plow lifts 30 will elevate plow lifts 30. A reverse movement of hand lever 107, thereby bringing into operation bevel gear 97 will lower plow lifts 30.

The mechanism for changing the pitch of plow lifts 30 is as follows, referring more particularly to Figs. 4 and 5:

Brackets 112 are secured to and depend from cross member 27 at the plow end of the carriage, and provide bearings 111 at their lower portions for the shaft 110 which is carried therein. Brackets 112 are slotted at 113 in a direction transverse to shaft 110 and above it, to receive and support rack bars 50 which slide therein. Pinions 115 are mounted on shaft 110 near its extremities, directly under rack bar 50. The bottom edge of each rack bar 50 is formed into a rack 116 which meshes with pinion 115. Rack bars 50 are connected to plow lifts 30 by members 51 as previously explained.

The floating bearing 56 has two depending legs 117 which provide bearings for shaft 118 of bevel gear 119 which meshes with the bevel gears 120, 121 freely mounted on shaft 110 and which are respectively engaged as desired by clutch members 122 slidably mounted on shaft 110 by key and keyway, this assembly of bevel gears and clutch members being the same type and operating in the same manner as that mounted on shaft 70 previously explained. The same type of forks and linkage system, terminating in hand control lever 125, to selectively place either bevel gear 120 or 121 in driving relationship, is employed as heretofore described in connection with the mechanisms for driving car 24 and elevating or lowering plow lifts 30. This assembly comprises forks 122 pivotally attached to and depending from link 123, which is connected to hand control lever 125 by link 126, hand control lever 125 being fulcrumed to the outer side member 22 at 127 in alignment with fulcrum 87a of hand lever 87.

Shaft 118 of bevel gear 119 carries a sprocket 128 directly underneath sprocket 66 on shaft 61, the two sprockets being connected by the chain belt 129.

The operation of the said mechanisms for changing the pitch of the plow lifts is as follows:

Motor shaft 52 through chain drive 58 drives jack shaft 54. Worm 59 of jack shaft 54 drives shaft 61 through worm gear 60 on the latter. Shaft 61 drives shaft 118 of bevel gear 119 through the chain drive 129. Bevel gear 119 drives shaft 110 through whichever of bevel gears 120 or 121 is engaged by a clutch member 122 by the movement of hand control lever 126 to the right or left (Fig. 4); pinions 115 on shaft 110 mesh with rack 116 of rack bars 50 thereby moving it forward or back as the case may be, and through members 51, plow lifts 30 are thrust forward or back in correspondence with the movement of rack bars 50, plow lifts 30 moving about their pivot on shaft 40.

To prevent the carriage from being lifted upward when the plow 32 is forced into the grain mass, hooks 130 are secured to and depend from the web of each outermost side member 22 and partially project under tracks 12.

As previously described tracks 12 at least at one place are partially notched at 131 so that when car 24 is brought in position with hooks 130 in alignment with notches 131, the car 24 may be lifted from bed 1. Notches 131 only partially extend into tracks 12 leaving part of the tracks at these points unimpaired so that car wheels 23 may smoothly ride past notches 131.

The car 24 will be provided with a platform or seat for the operator within convenient reach of the control levers which it is not considered necessary to be shown. The operation of the machine is clear from the foregoing description. The machine will start the plow operation at approximately 20 feet from the hopper end of the bed and after discharging the grain contents in that section, the machine will be reversed to another section and thus progressively the contents of the bed discharged. In these operations the plow will be pitched forward under the car. At the opposite end of the malting bed where it becomes necessary for the plow to reach in under the turning machine the plow will be pitched accordingly so as to reach close to the helices of the turning machine. The change of pitch of the plow will best be done by first withdrawing the plow from the grain mass and then changing the pitch while the plow is clear of the grain mass.

It is obvious that changes may be made in the embodiment of my invention hereinabove described without departing from the spirit of the invention as defined in the appended claims.

I claim:

1. A plow machine for use in plowing malting beds in the Saladin system of malting, comprising a car, a plurality of laterally spaced vertical lifts, each pivotally supported by two independent vertically spaced supports carried by said car through two independent connecting means each slidably mounted on said lift at vertically spaced positions thereon, one of said supports consisting of a transverse rotatable shaft and the other said support consisting of a longitudinally movable rack member, each said lift having a rack extending lengthwise thereof, a transverse plow secured to said lifts, drive means respectively mounted on said shaft support engaging the racks of said lifts, respectively, drive means, including clutch and reverse means for selectively driving said shaft and drive means for selectively moving said rack member support longitudinally.

2. A plow machine for use in plowing malting beds in the Saladin system of malting, comprising a car, a plurality of laterally spaced vertical lifts, two supports for each said lift separately mouted on said car at vertically spaced positions thereon, one of said supports comprising a rotatable transverse shaft and the other said support comprising a rack member slidably mounted in said car for longitudinal movement only, two separate connecting means for each said lift, one of said connecting means pivotally connecting said lift to said shaft and the other said connectnig means pivotally connecting said lift to said rack member, both said connecting means being slidably connected to said lift at vertically spaced positions thereon, each said lift having a rack extending lengthwise thereof, a transverse plow secured to said lifts, drive means mounted on said shaft respectively engaging the racks of said lifts, drive means, including clutch and reverse means, carried by said car for rotating said shaft, a second transverse rotatable shaft carried by said car having drive means thereon respectively engaging said rack members, drive means, including clutch and reverse means mounted on said second shaft, carried by said car, for rotating said shaft and causing a longitudinal movement of said rack members in either direction.

3. A malting plow machine for use in removing the grain mass from malting beds in the Saladin system of malting, comprising a car provided with impelling means for traversing the top of the malting bed, a pair of laterally spaced vertical lifts, two supports for each said lift separately mounted on said car at vertically spaced positions thereon, one of said supports comprising a rotatable transverse shaft and the other said support comprising a rack bar slidably mounted in said car for longitudinal movement only, two separate connecting means for each said lift, one of said connecting means pivotally connecting said lift to said shaft and the other said connecting means pivotally connecting said lift to said rack bar, both said connecting means being slidably connected to said lift at vertically spaced positions thereon, each said lift having a rack extending lengthwise thereof, a transverse plow secured to the lower ends of said lifts, the length of said lifts being such that said plow may be raised from the bottom of said malting bed clear of the grain mass therein, gears upon said shaft respectively engaging the racks of said lifts, drive means including clutch and reverse means carried by said car for rotating said shaft and means carried by said car for moving said rack bars longitudinally.

4. A malting plow machine for use in removing the grain mass from malting beds in the Saladin system of malting, comprising a car provided with impelling means for traversing the top of the malting bed, a pair of laterally spaced vertical lifts, two supports for each said lift separately mounted on said car at vertically spaced positions thereon, one of said supports comprising a rotatable transverse shaft and the other said support comprising a rack bar slidably mounted in said car for longitudinal movement only, two separate connecting means for each said lift, one of said connecting means pivotally connecting said lift to said shaft and the other said connecting means pivotally connecting said lift to said rack bar, both said connecting means being slidably connected to said lift at vertically spaced positions thereon, each said lift having a rack extending lengthwise thereof, a transverse plow secured to the lower ends of said lifts, the length of said lifts being such that said plow may be raised from the bottom of said malting bed clear of the grain mass therein, gears upon said shaft respectively engaging the racks of said lifts, drive means, including clutch and reverse means, carried by said car for rotating said shaft, a second transverse rotatable shaft carried by said car below said first named transverse shaft, gears mounted upon said second transverse shaft respectively engaging said rack bars, drive means, including clutch and reverse means mounted on said second transverse shaft, carried by said car for rotating said second transverse shaft and causing a longitudinal movement of said rack bars in either direction.

5. A malting plow machine comprising a car, a motor mounted in said car, traction means carried by said car, a hand controlled selective drive means carried by said car connected with said motor and traction means, a pair of laterally spaced vertical lifts, each pivotally supported by a rotatable transverse shaft carried by said car and also supported by a rack bar slidably mounted on said car independently of the mounting of said shaft for longitudinal movement only below the plane of the axis of said shaft, two separate connecting means for each said lift, one of which is pivotally mounted on said shaft and slidably mounted on said lift, and the other being pivotally mounted on said rack bar and slidably mounted on said lift, each said lift having a rack extending lengthwise thereof, a transverse plow secured to the lower ends of said lifts, the length of said lifts being such that said plow may be raised from the bottom of said malting bed clear of the grain mass therein, gears upon said shaft respectively engaging the racks of said lifts, a second hand controlled selective drive means carried by said car and connected to said motor for rotating said shaft, a second rotatable transverse shaft carried by said car below said first transverse shaft, pinions mounted on said second transverse shaft respectively engaging said rack bars, a third hand controlled selective drive means carried by said car and said second transverse shaft for rotating said last named shaft to cause longitudinal movement of said rack bars.

6. A malting plow machine for use in removing the grain mass for malting beds in the Saladin system of malting, comprising a car provided with impelling means for traversing the top of the malting bed, a pair of laterally spaced vertical lifts each having a rack extending lengthwise thereof, two supports for each said lift separately mounted on said car at vertically spaced positions thereon, one of said supports comprising a rotatable transverse shaft having gears thereon respectively engaging said racks, and the other said support comprising a rack bar slidably mounted in said car for longitudinal movement only, two pairs of hangers for each said lift, the hangers of one of said pairs being pivotally mounted on said shaft on opposite sides of one of said gears thereon, and slidably engaging the opposite sides of said lift, the hangers of the other of said pairs being pivotally mounted on said rack bar and slidably engaging the opposite sides of said lift, the said lift engaging positions of said pairs being vertically spaced, a transverse plow secured to the lower ends of said lifts, the length of said lifts being such that said plow may be raised from the bottom of said malting bed clear of the grain mass therein, drive means, including clutch and reverse means, carried by said car for rotating said shaft, a second transverse rotatable shaft carried by said car, gears mounted upon said second transverse shaft respectively engaging said rack bars, drive means, including clutch and reverse means mounted on said second transverse shaft, carried by said car for rotating said second transverse shaft and causing a longitudinal movement of said rack bars in either direction.

DAVID GRIMALDI.

REFERENCES CITED

The following references are of record in the file of this patent:

UNITED STATES PATENTS

| Number | Name | Date |
| --- | --- | --- |
| 627,217 | Thew | June 20, 1899 |
| 728,102 | Hebb | May 12, 1903 |
| 731,911 | Jones | June 23, 1903 |
| 803,586 | Ham | Nov. 7, 1905 |
| 837,688 | Knox | Dec. 4, 1906 |
| 853,385 | Treviranus | May 14, 1907 |
| 923,139 | Clarke | June 1, 1909 |
| 966,986 | Barnett et al. | Aug. 9, 1910 |
| 1,028,404 | Trabue | June 4, 1912 |
| 1,528,269 | Schoenfeld | March 3, 1925 |
| 2,129,453 | Van Sickle | Sept. 6, 1938 |
| 2,406,546 | Kinney et al. | Aug. 27, 1946 |